(No Model.)
W. E. PRALL.
COOKING RANGE.
No. 252,057. Patented Jan. 10, 1882.
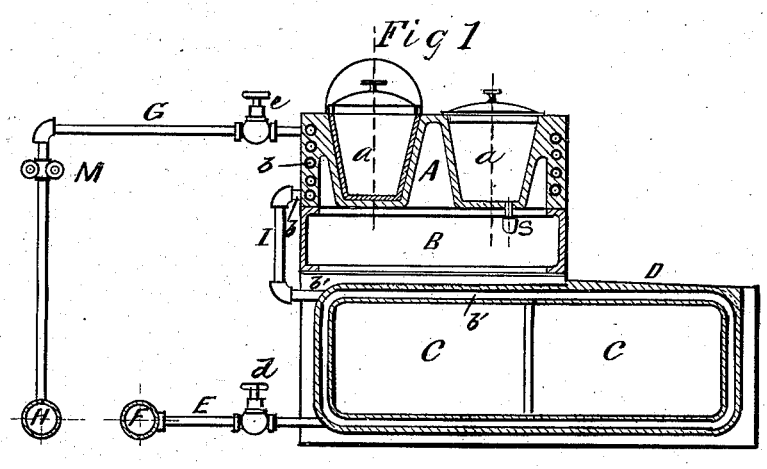
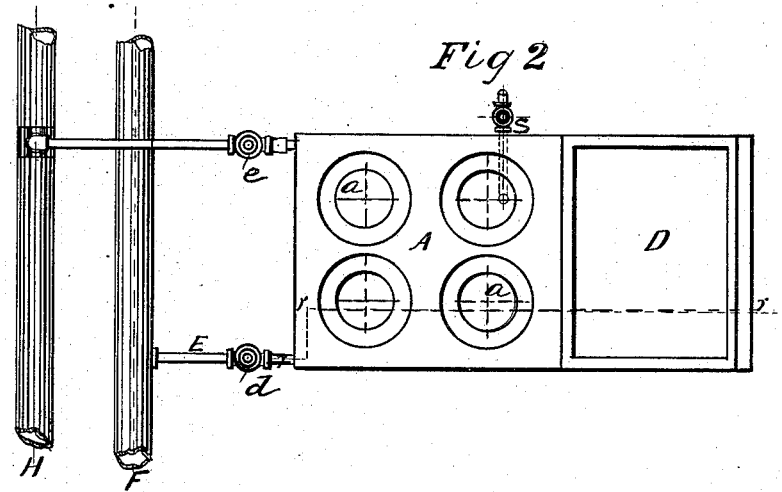
WITNESSES
John Fish
T. L. Jones
INVENTOR
W. E. Prall (No Model.)

W. E. PRALL.
COOKING RANGE.

No. 252,057. Patented Jan. 10, 1882.

WITNESSES.
John Fish
T. L. Jones

INVENTOR.
W. E. Prall.

(No Model.)
W. E. PRALL.
COOKING RANGE.
No. 252,057. Patented Jan. 10, 1882.
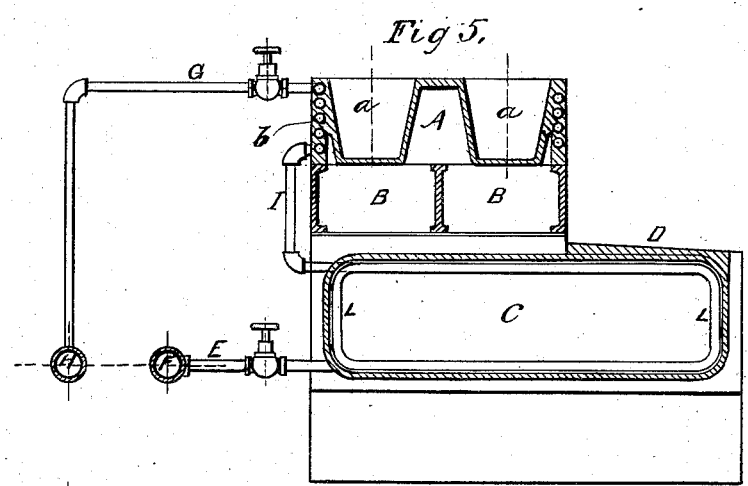
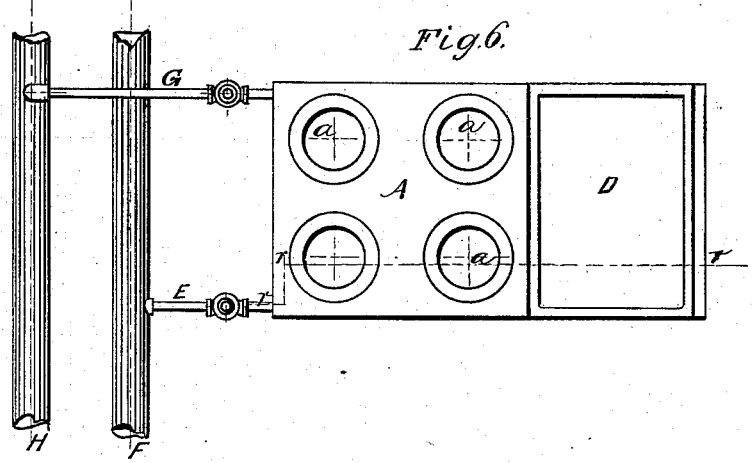
WITNESSES
John Fish
T. H. Jones
INVENTOR
W. E. Prall (No Model.)
5 Sheets—Sheet 4.
W. E. PRALL.
COOKING RANGE.
No. 252,057.
Patented Jan. 10, 1882.
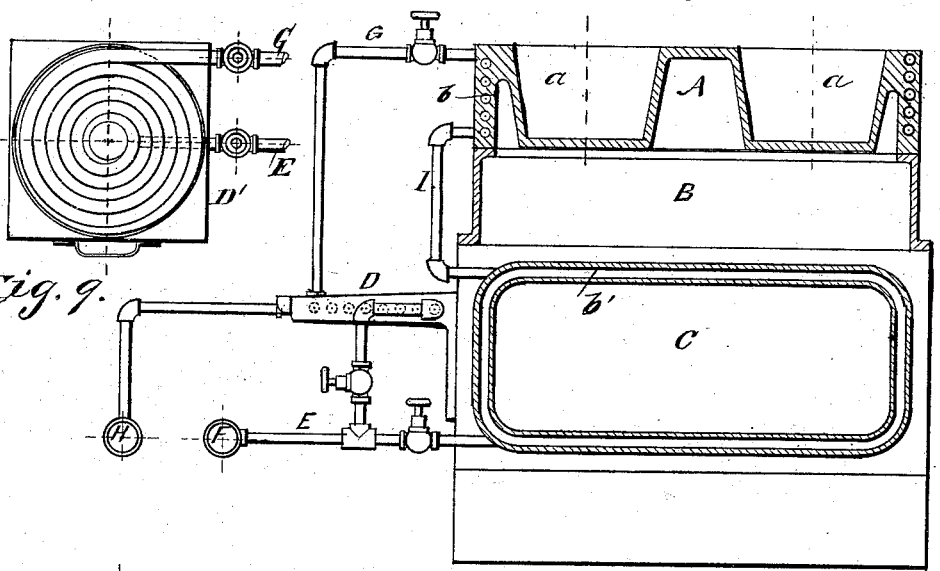
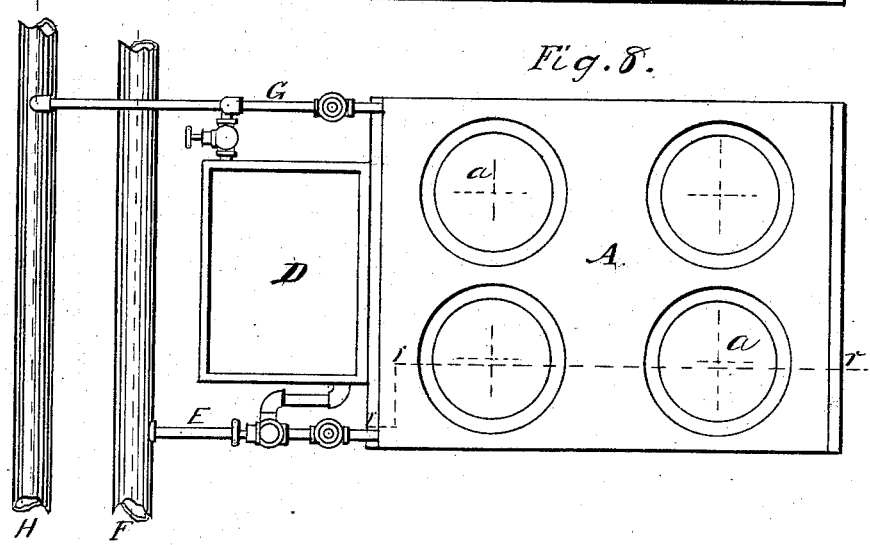
Witnesses
John Fish
T. L. Jones
Inventor
W. E. Prall

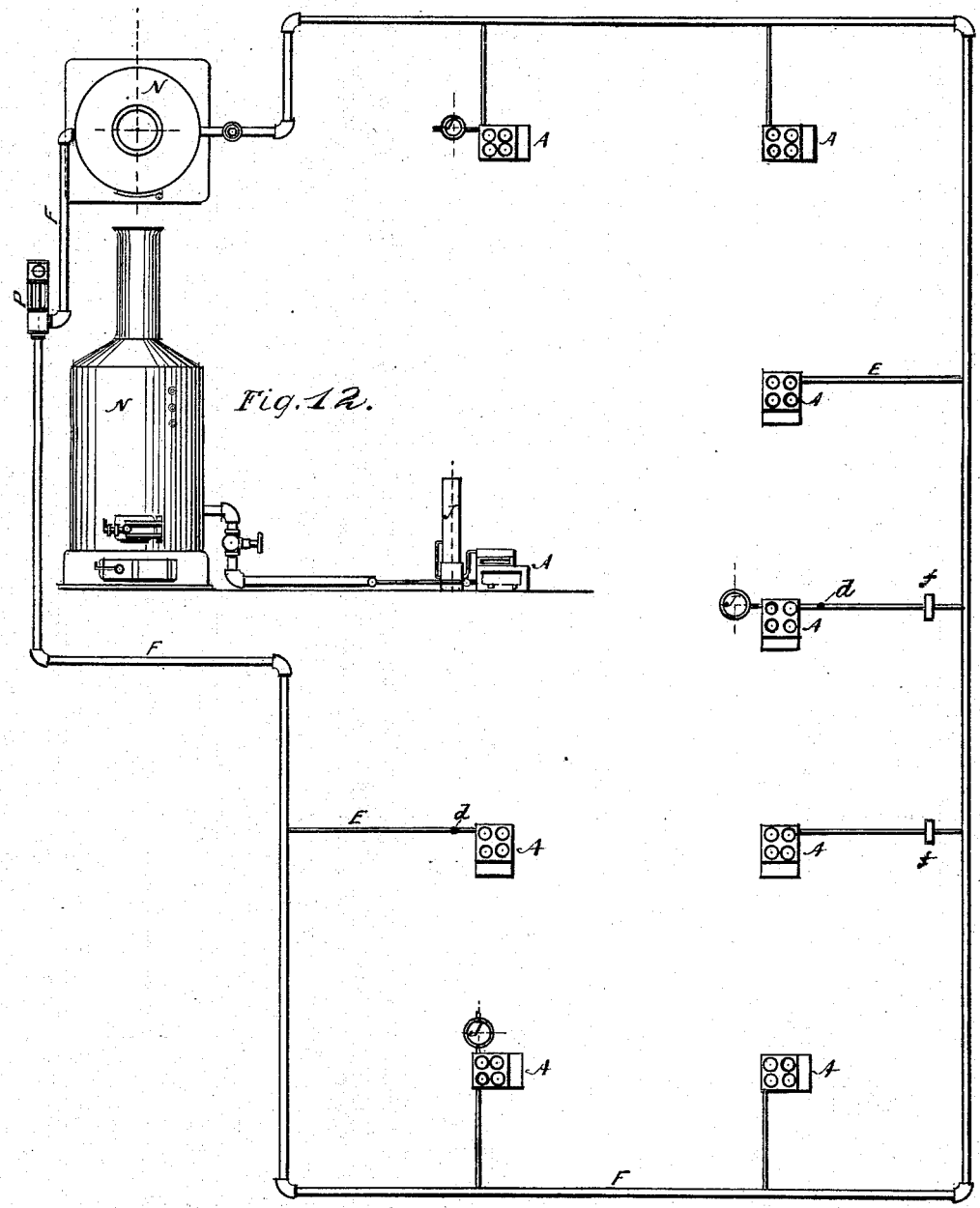

UNITED STATES PATENT OFFICE.

WILLIAM E. PRALL, OF NEW YORK, N. Y.

COOKING-RANGE.

SPECIFICATION forming part of Letters Patent No. 252,057, dated January 10, 1882.

Application filed December 17, 1880. (No model.)

*To all whom it may concern:*

Be it known that I, WILLIAM E. PRALL, of New York city, county of New York, and State of New York, have invented certain new and useful Improvements in Cooking-Ranges and Supplying Heat for Cooking Purposes; and I do hereby declare the following to be a full, clear, and exact description of the invention, reference being had to the accompanying drawings, and to the letters of reference marked thereon, which form a part of this specification.

This invention is in the nature of apparatus for utilizing superheated water for cooking purposes and a method of circulating or distributing such heat-supply.

The invention consists in a cooking apparatus provided with compartments for effecting the operations of boiling, baking, broiling, &c., and heated by means of superheated water supplied thereto in the manner and under the conditions hereinafter specified.

The invention also consists in supplying to a series of cooking apparatus, each independently controllable, superheated water circulating from a generator through a main and service-pipes in a return-circuit, all as hereinafter specified and claimed.

Figure 3:
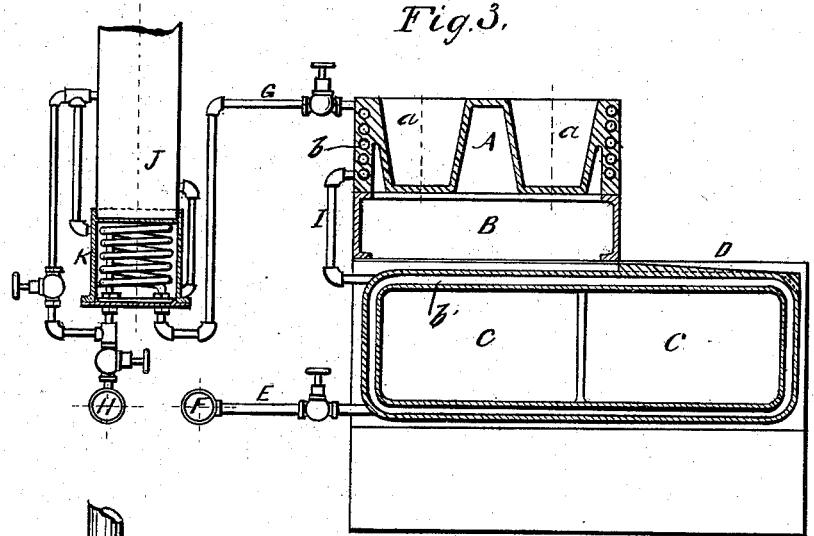
Figure 4:
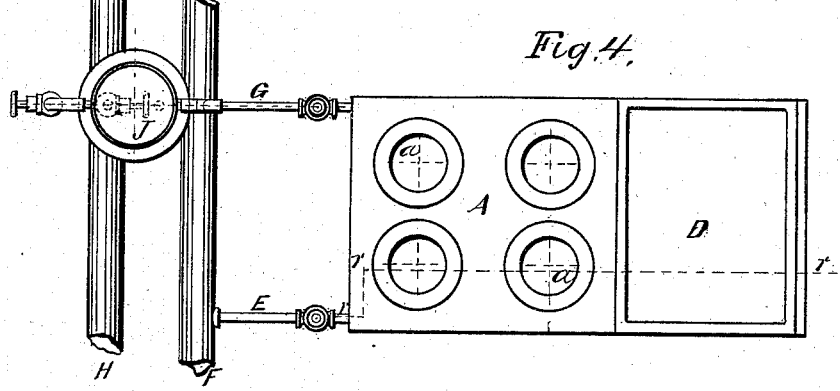

In the drawings, Figures 1, 2, 3, 4, 5, 6, 7, and 8 show respectively vertical sections and top plan views of various forms of my cooking-range. Figs. 9 and 10 show respectively a top plan view and vertical section of one form of broiler. Fig. 11 is a diagram illustrating my system; and Fig. 12 is an outline elevation of the heat-generator and cooking apparatus. The sections, Figs. 1, 3, 5, and 7, are taken on the lines $r\, r$, Figs. 2, 4, 6, and 8, respectively.

In the several figures, A is a boiling apparatus provided with pots or pot-cavities $a$ for cooking purposes.

B is a warming-oven, and C a baking-oven, the warming-oven being intermediate of the others. The warming-oven gets its heat from the boiling-oven, while the baking-oven is separated from it, and preferably surrounded by suitable non-conducting material, so as to prevent loss of heat by radiation. I form the boiling-oven by coiling pipe $b$ around a block of the outline of the desired structure, then placing such coiled pipe in a suitable mold and casting around it an oven of the desired form. A similar coil of pipe, $b'$, is likewise treated to form the baking-oven, and the two coils are connected by a joint, I. The warming-oven need have no coil. The pipes $b\, b$ are of wrought metal. The pots or pockets $a$ are preferably conical and of the depth of the oven, so as to obtain the greatest area of heating-surface. When these pockets are used as pots they will be provided with cocks S, whereby to draw off liquids.

Instead of casting the oven about the pipes or embedding the pipes in the walls of the ovens, as described, I may coil the pipe to shape and simply insert it in the interior of the previously cast oven. (See Fig. 5, L.) This last construction can be made with economy, and, besides, has the advantage of bringing the heat most directly into contact with the substance to be cooked. The baking-oven may be extended rearwardly of the boiling-oven, and its upper surface, D, will form a broiler, which is not provided with the non-conducting jacket; or this broiler may be separately formed by extending the baking-oven forward into a shelf, Figs. 7 and 8, and casting in such shelf a coil of pipe. This construction is necessitated by making the boiling and baking ovens of the same size.

A detached broiler may consist of a coil, D', of pipe, Figs. 9 and 10, laid in a covered metal box, $c$.

The heating element is supplied from a main, F, through service-pipes E, and after being used in the heating apparatus is returned by a pipe, G, to the return-main H, or is allowed to escape by a waste-pipe, or is used for heating water, or general purposes. This heating element is superheated water, and it is supplied under pressure from a generator, N, Figs. 11 and 12, of any suitable construction, to the main F. Circulation is kept up in the main, generator, and ovens by means of a supply-pump, P. The supply of this superheated water to each oven is regulated by valves $d$ placed in the service-pipes E, and the discharge thereof controlled by cocks $e$ in the escape-pipe. After the water has done its work in the cooking apparatus it may be carried in a coiled pipe into a vessel, K, Figs. 3 and 4, to heat water by radiation, and then be returned to the generator for reheating; or it may be allowed to escape into a vessel, J, containing water, and mingle with such water.

In the operation of my invention the water in the generator and the mains is under an equable pressure, and a constant and rapid circulation is maintained therethrough by means of the force-pump. The mains are laid underground, and are covered with non-conducting material, so that the temperature of the water at the generator and at the point of use varies but slightly.

The advantages in cities and towns of transmitting heat for culinary and heating purposes in accordance with this system are manifold and apparent, for thereby the use of fuel on the premises of consumers is obviated, the heat is used only so long as it is absolutely needed, and then is immediately shut off without waste and at a saving. There is no loss of time in lighting and starting fires, no dust, no ashes, no danger from explosion or fire. One fire only for a district is required, which is under the generator, and there under the control of a skilled fireman. By this arrangement a cheaper grade of fuel can be used than is possible with the ordinary house-range, and better results obtained. The heat in the cooking apparatus is maintainable at a uniform temperature, whereby food can be cooked much more satisfactorily.

A water-meter, $f$, may be connected with each service-pipe, and the takers may thus be equitably charged for consumption.

The force-pump P may be of any approved pattern, or any equivalent means may be used for creating circulation. A forced circulation is essential to effectually compensate for the long distances to be traveled and friction and irregularities in the mains. By returning the water after use to the generator I effect an economy of fuel, since I take the supply to the generator from heated instead of cold water.

It has been demonstrated that steam, while entirely satisfactory as a warming or heating means when conveyed in mains, is not practical as a heat-supply for cooking purposes, and, on the other hand, it has been demonstrated that hot water for a heat-supply for cooking purposes is entirely practical and eminently successful, both at long and short distances from the source of supply. Hot water has been used for heating cooking apparatus, but never in such a way as to furnish the sole source of heat-supply, and never under a positive or forced circulation. It is believed to be impossible to obtain the necessary heat from any circulating system unless the circulation is forced, and the heating medium is kept thus constantly in motion and under pressure. Superheated water under these conditions furnishes the most satisfactory heating medium for all distances that has yet been discovered.

What I claim is—

1. A cooking-oven constructed with a continuous channel-way or pipe, arranged to receive superheated water from the generator under pressure, so as to conduct it in a continuous stream around the oven, and provided with a valve to control the discharge of the water from the oven, and also the pressure, constructed and operating substantially as and for the purpose set forth.

2. A cooking-oven constructed with a continuous channel-way or pipe surrounding it, arranged to receive superheated water from the generator, and provided with a cock for controlling the discharge of water therefrom, in combination with a hot-water tank arranged to receive the water therefrom, as shown and described.

3. In a system for supplying superheated water as a heating medium for culinary purposes, the combination of a series of cooking apparatus, each constructed as described, and independently controllable as to its heat-supply, an apparatus for superheating water, and pipes leading therefrom to the cooking apparatus and from the cooking apparatus to other vessels to be warmed, and thereby adapted to supply heat thereto and conduct it therefrom, substantially as described.

4. In an apparatus for cooking by means of superheated water, the combination of a local heater, a street pipe or pipes connected thereto to convey the superheated water therefrom, a pump for circulating the water therein, service-pipes for conveying the water therefrom, and arranged to radiate the heat into cooking ovens or chambers, and provided with cocks or valves for controlling the flow of water thereto or therefrom, substantially as shown and described.

5. A cooking apparatus provided with a connected water-heating vessel, combined with an apparatus for supplying superheated water, pipes for distributing such water to the cooking apparatus, and pipes by which, after its heat is utilized in the cooking apparatus, it is conducted into or through the said water-heating vessel to impart heat to its contents, substantially as described.

6. In an apparatus for cooking with superheated water, the water-heating apparatus, the circulating-tubing connected thereto, a force-pump or its equivalent for circulating the water therein, branch pipes for conveying the water to the ovens, cocks or valves for controlling the discharge of water therefrom, and the meter, combined to operate substantially as set forth.

WM. E. PRALL.

Witnesses:
JOHN FISH,
T. L. JONES.